United States Patent
Yang et al.

(10) Patent No.: US 8,139,085 B2
(45) Date of Patent: *Mar. 20, 2012

(54) DISPLAY DATA EXTRACTION METHODS, DEVICES AND COMPUTER SYSTEMS UTILIZING THE SAME

(75) Inventors: Hung Chun Yang, Chunghe (TW); Wan Chi Luo, Tainan (TW); Chen-Fu Huang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/166,123

(22) Filed: Jun. 22, 2011

(65) Prior Publication Data

US 2011/0249138 A1 Oct. 13, 2011

Related U.S. Application Data

(63) Continuation of application No. 11/676,537, filed on Feb. 20, 2007, now Pat. No. 7,995,075.

(60) Provisional application No. 60/778,194, filed on Mar. 2, 2006.

(51) Int. Cl.
*G09G 5/00* (2006.01)
(52) U.S. Cl. ......... 345/619; 345/418; 345/581; 345/625
(58) Field of Classification Search ................... None
See application file for complete search history.

(56) References Cited

U.S. PATENT DOCUMENTS

| | | | |
|---|---|---|---|
| 5,546,580 | A | 8/1996 | Seliger et al. |
| 5,796,428 | A | 8/1998 | Matsumoto et al. |
| 5,806,521 | A | 9/1998 | Morimoto et al. |
| 5,825,876 | A | 10/1998 | Peterson, Jr. |
| 7,110,137 | B2 | 9/2006 | Burgess et al. |
| 2002/0078156 | A1 | 6/2002 | Choi |
| 2002/0097418 | A1 | 7/2002 | Chang et al. |
| 2003/0200507 | A1 | 10/2003 | Stern et al. |
| 2004/0044863 | A1 | 3/2004 | Trimmer et al. |
| 2004/0096117 | A1 | 5/2004 | Cockshott |
| 2004/0170383 | A1 | 9/2004 | Mazure |
| 2005/0244033 | A1 | 11/2005 | Ekin et al. |
| 2006/0274163 | A1 | 12/2006 | Levien et al. |

FOREIGN PATENT DOCUMENTS

| | | |
|---|---|---|
| CN | 1677376 | 10/2005 |
| JP | 62284582 | 12/1987 |

OTHER PUBLICATIONS

PCT Search Report mailed Jun. 14, 2007.

*Primary Examiner* — Kee M Tung
*Assistant Examiner* — Jwalant Amin
(74) *Attorney, Agent, or Firm* — Thoams|Kayden

(57) ABSTRACT

A device of capturing display data is implemented in an electronic device. A first request for capture of display data associated with the display of the electronic device is received. The display is a composite image generated by a program from one or more raw data objects in the electronic device. When the first request is received, a backup of the display data, comprising the one or more raw data objects, is stored by the electronic device in form of a data structure in response to the first request.

18 Claims, 10 Drawing Sheets

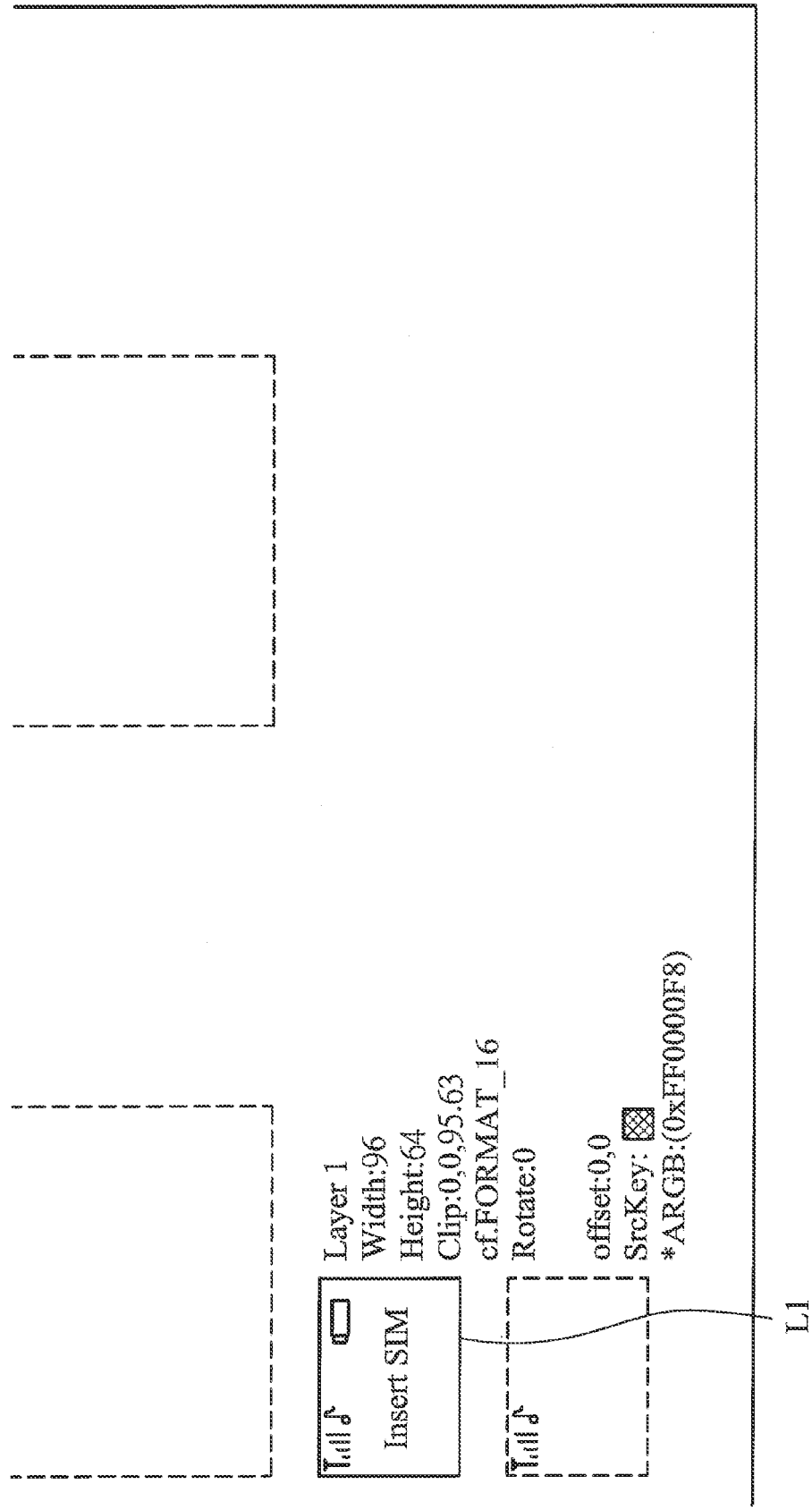

DISPLAY DATA EXTRACTION METHODS, DEVICES AND COMPUTER SYSTEMS UTILIZING THE SAME

CROSS REFERENCE TO RELATED APPLICATIONS

This application is a Continuation of application Ser. No. 11/676,537, filed Feb. 20, 2007, which claims the benefit of provisional Application No. 60/778,194, filed Mar. 2, 2006, the entirety of which are incorporated by reference herein.

BACKGROUND OF THE INVENTION

1. Field of the Invention

The invention relates to computer techniques, and more particularly to display data extraction methods and devices.

2. Description of the Related Art

As embedded systems become increasingly more powerful in computing and display capabilities, user interfaces (UI) thereof gain complexity accordingly. However, due to the complexity, UI display may have some errors and not be consistent with original design; it can be difficult to locate the source of abnormality. It could be also difficult to describe and report located exceptions. A digital camera may be utilized to capture images of the UI display for error analysis, but the images may not provide sufficient information for UI display debugging.

BRIEF SUMMARY OF THE INVENTION

A detailed description is given in the following embodiments with reference to the accompanying drawings.

An exemplary embodiment of a method of capturing display data is implemented in an electronic device and comprises the following steps. A first request for capture of display data associated with a display of the electronic device is received. Displayed data comprises a composite image generated by a program from one or more raw data objects in the electronic device. When the first request is received, a backup of the display data, comprising the one or more raw data objects, is stored by the electronic device in form of a data structure, in response to the first request.

An exemplary embodiment of a method of capturing display data, comprising the following steps, is implemented in an electronic device equipped with a primary display and a secondary display. When a first request for capture of a first set of display data associated with the primary display and a second set of display data associated with a secondary display is received, a backup of the first and second sets of display data is stored in form of a data structure in response to the first request.

An exemplary embodiment of a method of capturing display data is implemented in an electronic device equipped with a display. When a first request for capture of display data associated with the display is received, a backup of the display data comprising settings of the display is stored in form of a data structure in response to the first request.

An exemplary embodiment of an electronic device comprises a display and a processor. The display shows a composite image generated by a program from one or more raw data objects in the electronic device. When receiving a first request for capture of display data, the processor stores a backup of the display data comprising the one or more raw data objects in form of a data structure in response to the first request.

An exemplary embodiment of an electronic device comprises a primary display, a secondary display, and a processor. When receiving a first request for capture of display data, the processor stores a backup of a first set of display data associated with the first display and a second set of display data associated with the second display in form of a data structure in response to the first request.

An exemplary embodiment of a computer system, comprises an electronic device and a computer. The electronic device comprises a display and a processor. The display is a composite image generated by a program from one or more raw data objects in the electronic device. The processor, when receiving a first request for capture of display data, stores a backup of the display data comprising the one or more raw data objects in form of a data structure in response to the first request. When receiving the data structure, the computer utilizes the data structure to reproduce the display on a display of the computer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
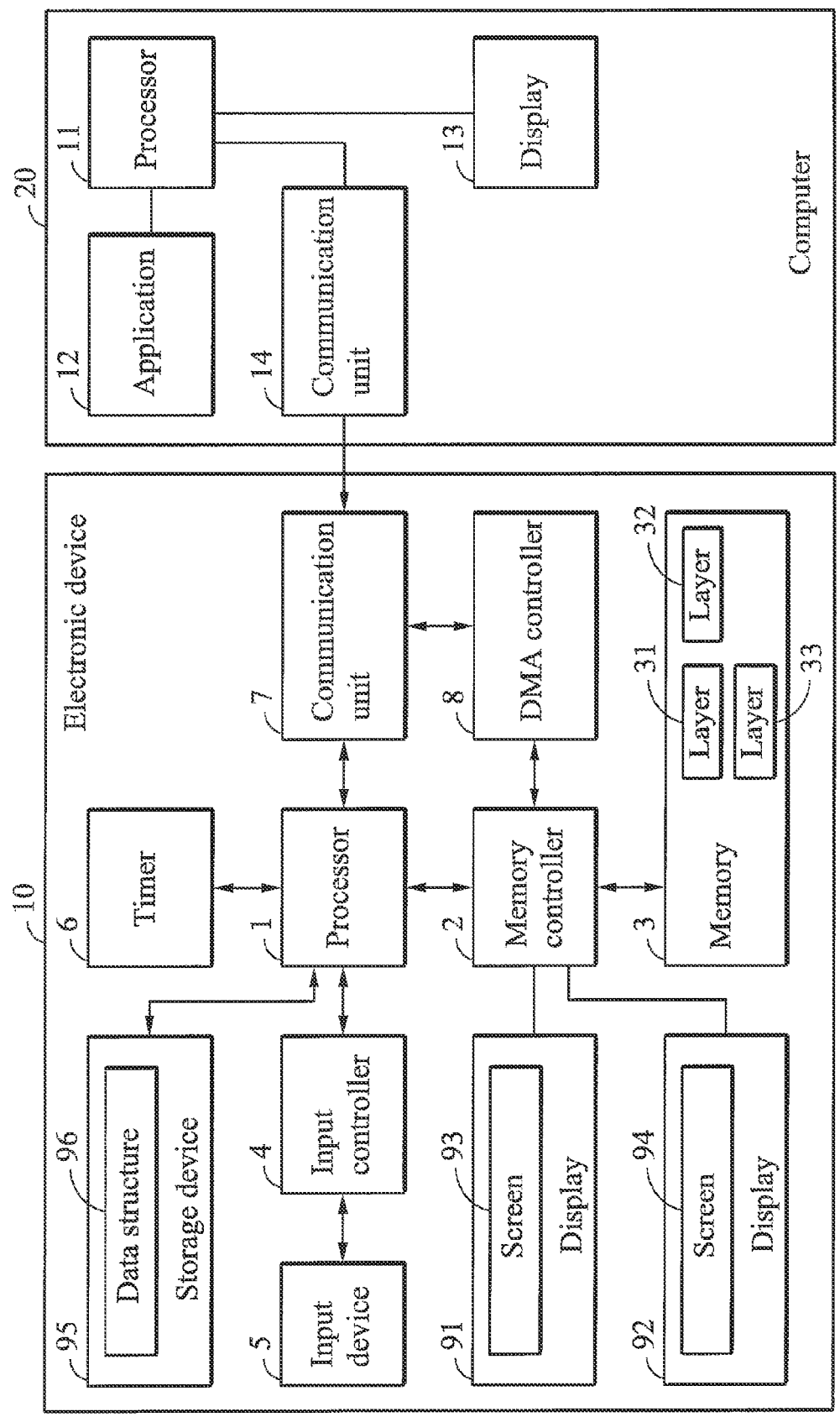
FIG. 1 is a block diagram of an electronic device and a computer.

The following description is of the best-contemplated mode of carrying out the invention. This description is made for the purpose of illustrating the general principles of the invention and should not be taken in a limiting sense. The scope of the invention is best determined by reference to the appended claims.

Display data extraction methods and devices are provided in the following by exemplary embodiments organized as:

1. Hardware configuration
2. Display data extraction
3. Display data transport
4. Display reproduction
5. Variations
6. Conclusion Hardware Configuration With reference to FIG. 1, electronic device 10 may be coupled to a port (such as a COM port, universal serial bus (USB) port, or a FireWire port) of computer 20 through a cable or wireless connection, such as via Bluetooth, infrared, radio frequency, or others. Alternatively, electronic device 10 and computer 20 may be coupled through a network, such as a local area network (LAN), a wide area network (WAN), or the Internet.

The electronic device 10 may comprise a mobile phone, a personal digital assistant (PDA), a laptop computer, a tablet personal computer (PC), or any other device equipped with a display. Preferably, electronic device 10 comprises an embedded system with limited resources.

In electronic device 10, processor 1 controls operation of the entire system as it fetches and executes software codes stored in memory 3. Memory controller 2 serves as the bridge between processor 1 and memory 3 to transfer data therebetween. Input controller 4 detects states of input device 5 and provides input signals accordingly to processor 1. Input device 5 may comprise a keypad, a touch panel, a touch display, and/or a voice control device. Timer 6 provides timing information to processor 1, so that processor 1 can determine the occurrence time of certain events. Timer 6 can also notify processor 1 at a predetermined time to begin certain operations, such as display data capture. Timer 6 may comprise a plurality of timing devices, such as a clock reporting current time and a timer triggering events or operations. Displays 91 and 92 may comprise primary and secondary displays disposed in different locations of electronic device 10.

Communication unit 7 receives data from and transmits data to computer 20 through a cabled or wireless communication channel. In some embodiments, communication unit 7 may comprise infrared, radio frequency (RF), Bluetooth, or other transceiver. Additionally, when the method is embodied in a mobile phone, communication unit 7 may comprise a cellular MODEM unit, such as a GSM/GPRS or W-CDMA communication module, which communicates with the cellular network in compliance with the GSM/GPRS or W-CDMA standards.

Data outgoing to computer 20 may be prepared and provided by processor 1, or preferably by DMA controller 8 which obtains data unit from memory 3 through memory controller 2 without intervention of processor 1.

When electronic device 10 is to send a data unit to computer 20, processor 1 composes the data unit in memory 3, and programs DMA controller 8 to transfer the data unit through communication unit 7 to computer 20. Conversely, when a data unit is received from computer 20, the incoming data unit can go through communication unit 7, DMA controller 8 and memory controller 2 to memory 3. Processor 1 then accesses the data unit in memory 3 to perform necessary operations.

In some embodiments of the electronic device, two components, such as processor 1, memory controller 2, memory 3, or DMA controller 6 may be integrated into a single chip. Some embodiments of the electronic device may comprise only one display. Computer 20 may also comprise a mobile device (such as a cell phone or a PDA), a VoIP phone, a laptop or desktop computer, or any other device. An embodiment of display data extraction methods may be implemented in electronic device 10 or other devices.

Display Data Extraction

A program executed by electronic device 10 may generate a display to be shown on any of displays 91 and 92 by combining a plurality of objects therein. These objects, referred to as raw display data, may comprise text, vector images, bitmaps, image layers, and other visual or pictorial objects. The program may be concluded in an operating system or an application. For example, an application executed by electronic device 10 may display a graphical user interface (GUI) display by invoking a function of a graphics subsystem, such as a graphics device interface (GDI) and send parameters of the raw data thereto. The subsystem in turn sends commands to a driver of a display, and the display driver accordingly renders the display. GDI is a graphics subsystem and a standard for representing graphical objects and transmitting them to output devices. Examples of graphics subsystems further comprise QuickDraw from Apple Computer, Inc.

A snapshot of the current display may be taken for further analysis when exceptions arise. For example, appearance of user interface (UI) on a display may sometimes be inconsistent with original design. Since the difference therebetween may be imperceptible, simple display captures may not be sufficient, for example the difference between color ARGB (alpha, red, green, and blue) 0xFF00EE and ARGB 0xFF00ED. More information associated with a problematic display is thus required to assist in troubleshooting.

Electronic device 10 may store and transmit display data to other devices in response to a corresponding trigger signal, such as a keystroke. The response process may be automatically executed by device 10, or semi-automatically, after permission from a user of device 10. The user permission may be received from a user interface prompt generated upon receiving the trigger signal. Names, identification, or addresses of external devices requesting display data extraction may be shown in the user interface. Computer 20 may generate and send a first request to electronic device 10 to trigger display data extraction. Extraction of display data may be triggered by a trigger signal, such as the first request, a message or signal responding thereto, or any other means. Note that the trigger signal may be generated by any other device, such as by electronic device 10, or a device authorized by and connected to device 10. The trigger signal may be automatically generated or in response to an input operation.

Figure 2:
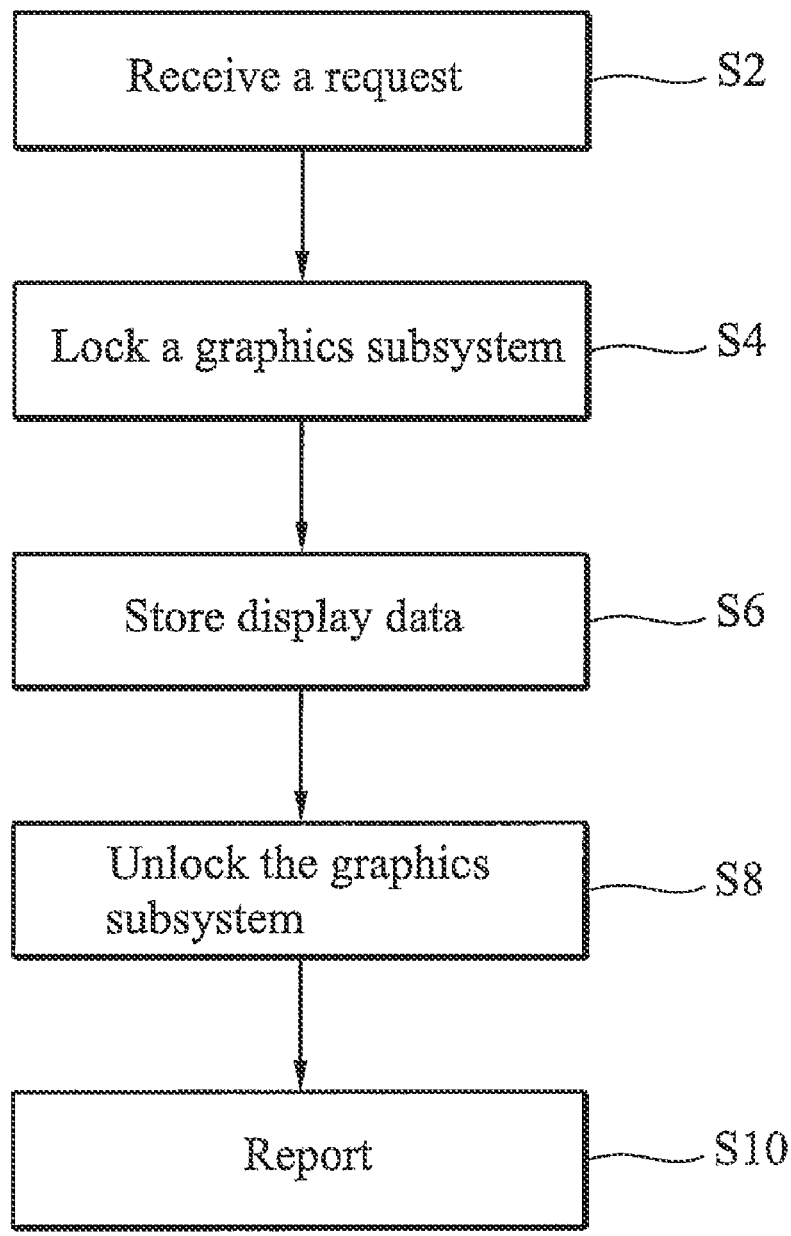
FIG. 2 is a flowchart of an exemplary embodiment of a display data extraction method.

With reference to FIG. 2, when receiving a first request for capture of display data displayed on electronic device 10 (step S2), processor 1 enables a lock mechanism preventing the display data from any changes after reception of the first request (step S4), stores a backup of the display data in form of a data structure in response to the first request (step S6), and disables the lock mechanism after completing storage of the backup of display data (step S8). When the backup of the display data is successfully stored in an assigned location, processor 1 reports completion of display data storage to the source of the first request (step S10). The assigned location for storing display data backup may be allocated in various areas of a memory or a nonvolatile storage device of in electronic device 10.

The first request may be triggered by a manual control or other means (such as a voice command, touch pad or mouse signal) on electronic device 10, computer 20, or another device capable of communication with electronic device 10. For example, the first request may be triggered by input device 5 of electronic device 10. The manual control may be a physical control on a keypad or a virtual control on a display (such as display 91, 92, or 13).

Figure 3:
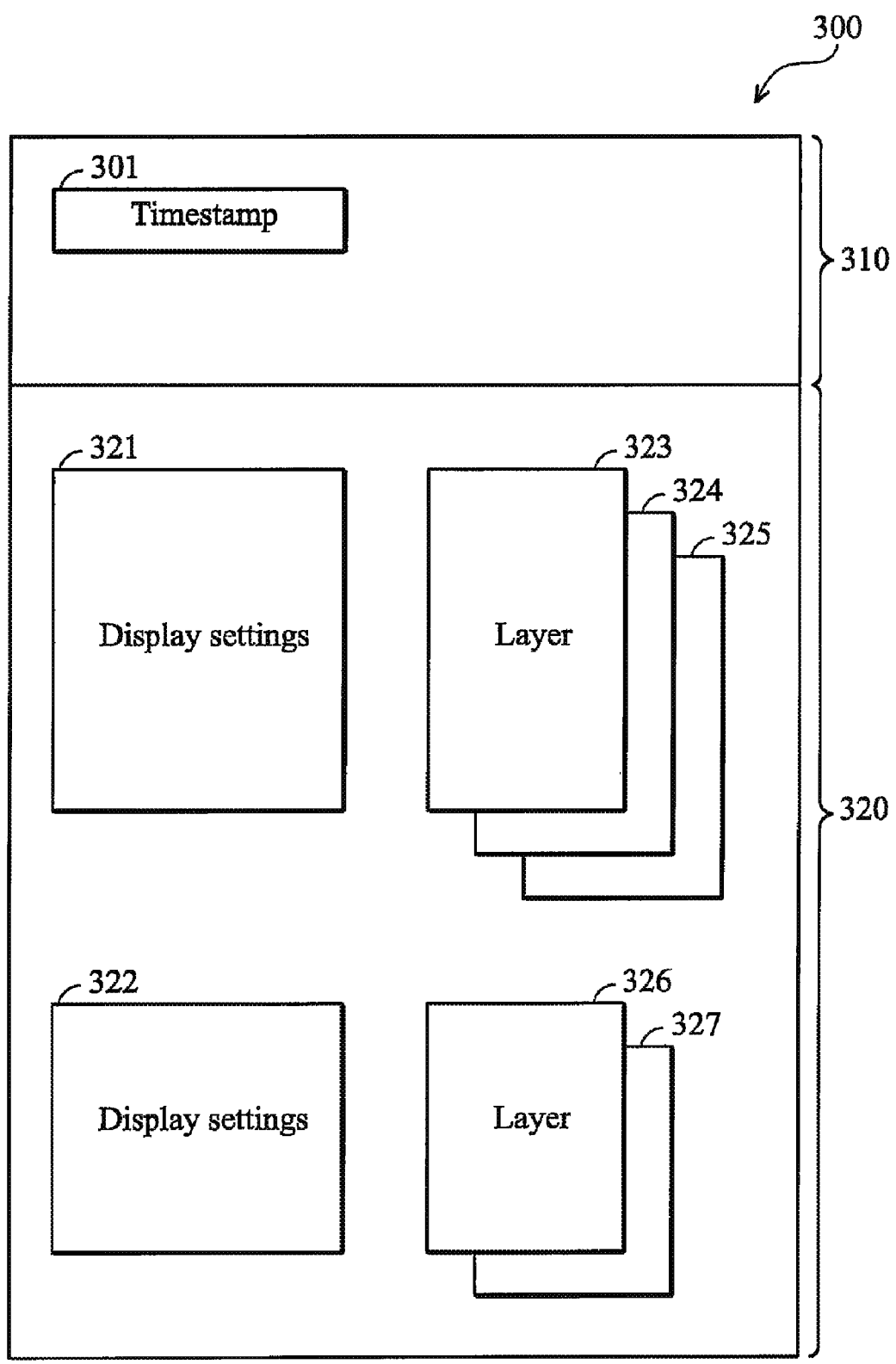
FIG. 3 shows an example of a data structure for storing display data.

Display data comprises a composite image generated from one or more raw data objects by a program executed by electronic device 10. For example, layers 31 and 32 in FIG. 1 are organized in a layered structure as raw data of display 93, and layer 33 is a raw data object of display 94. When receiving the first request, processor 1 may simultaneously store a backup of a first set of display data for display 93 and a second set of display data for display 94 in form of the data structure in response to the first request. Layers 31 and 32 are included in the first set of display data, and layer 33 is included in the second set of display data. Note that each display may comprise one or more layers, and raw data objects of the display are not limited to layers, which may further comprise text, icons, vector or bitmap images, and other object on each layer. Backed up display data may comprise more information. FIG. 3 shows an example of the data structure storing backed up display data.

With reference to FIG. 3, data structure 300 comprises header 310 and payload 320. Header 310 comprises information for the backup (or snapshot) of the display data, such as timestamp 301 indicating the setup time of the backup, backup ID, and others. Payload 320 comprises settings 321 of a primary display (such as display 91) and settings 322 of a secondary display (such as display 92), constituent objects (such as layers 323, 324, and 325) of a display on the primary display, and constituent objects (such as layers 326 and 327) of a display on the secondary display. Payload 320 may further comprise other data such as attributes of the one or more raw data objects, display snapshots, driver settings, or others. For example, snapshots of displays 93 and 94 may be taken and recorded in payload of data structure 96 in storage device 95 in FIG. 1.

In step S4, the lock mechanism when enabled may prevent accesses to a graphics subsystem (such as a GDI).

In step S6, snapshots of displays 93 and 94 and GDI information may be captured and stored as the display data for displays 93 and 94. Snapshots of displays 93 and 94 may be extracted from images in a video memory (not shown) of electronic device 10. The images in a video memory are respectively output by drivers of displays 91 and 92. The display data may comprise those which have not been processed by the drivers. The display data may be distributed in and captured from a main memory, a storage device, a display adapter, or other component of an electronic device. Display data may be tracked through GDI information. Additionally, processor 1 may store the backup of the display data in a storage device manageable by a file system of electronic device 10 or in memory 3. Duplicated backups of display data may be stored in different memory areas, or different memory devices. The first request may be served by a plurality of service routines, or handlers implemented by computer programs or circuits. For example, a first and a second handler can both provide service routines to the first request, which when executed respectively store the backup of the display data in a storage device through the file system and in memory 3 transparent to the file system. When an exception has caused the first handler or the file system to fail, the second handler initiates to respond the request by storing a backup of the display data in memory 3, such that the backup in memory 3 can be accessed and transmitted to computer 20. The second handler may be implemented by a memory resident program (such as a daemon), firmware, or a hardware handler.

Attributes comprise runtime settings of a raw data object, comprising at least the position on the display, transparency color, opacity ratio, dimension, rotation, color format, or clipping area of a raw data object. The clipping area is an area with higher probability than other areas for the raw data object to be shown on the display, and is also the very assigned area to which operations demanded for the raw data object are applied while the other areas are skipped by the operations. Display settings may comprise display ID, width and height of a display, layer count, a region of interest (ROI), and others. An ROI specifies the region on a display with a high probability of pixel update. For example, an ROI of a display may be a region surrounding a cursor thereon.

Processor 1 may further actively and periodically store current display data associated with the current displays in a buffer. Successive snapshots of display data can be utilized to analyze the impact of a certain operation of electronic device 10 on the display. For example, snapshots of display data for a display may be successively taken during a period ranging from before to after the receipt of a message by electronic device 10. Thus, impact of the message receipt on displays may be revealed. Electronic device 10 can be switched to a proper mode to perform the process of FIG. 3 or FIG. 4.

Figure 4:
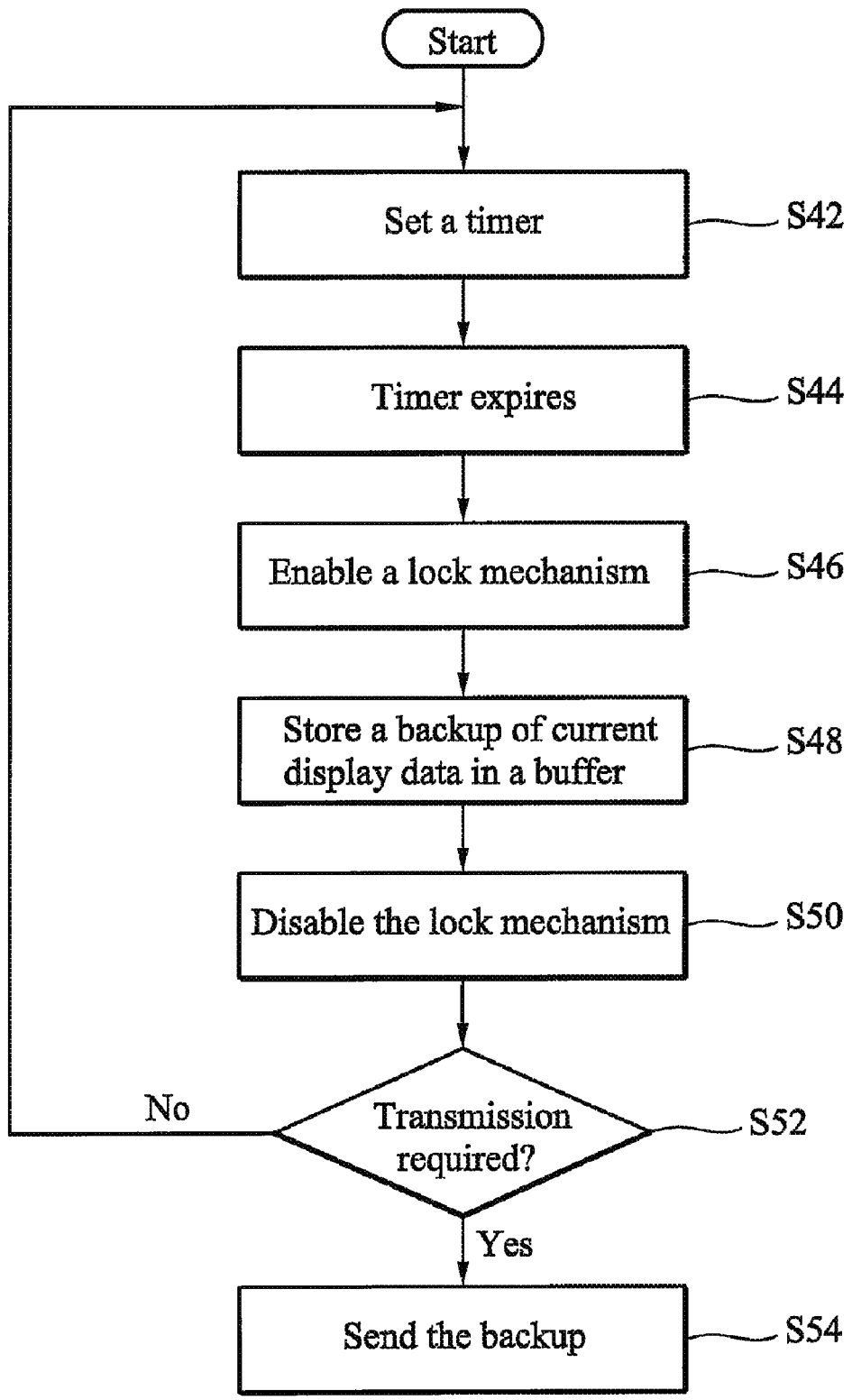
FIG. 4 is a flowchart of another exemplary embodiment of a display data extraction method.

With reference to FIG. 4, processor 1 sets a timer (step S42). When the timer expires (step S44), processor 1 enables a lock mechanism to prevent any change in the display data (step S46), stores in a buffer a backup of the current display data (step S48), and disables the lock mechanism after completion of storage of the display data (step S50). Processor 1 determines if transmission of the stored backup of the display data to computer 20 is required (step S52). If so, processor 1 sends the stored backup to computer 20 (step S54). If not, step S42 is repeated.

In step 48, processor 1 may store timestamp for each backed up display data therein. When the buffer is full, the backup of the current display data may overwrite the most or any previously backed-up display data. The buffer may be located in memory 3, storage device 95, or any other storage location in electronic device 10. Storage device 95 may be a fixed or portable storage device, such as a portable memory card. Examples of memory cards comprise compact flash (CF) Cards, SmartMedia (SM) cards, memory sticks, secure digital cards (SD), MultiMediaCard (MMC), xD-Picture cards, and IBM Microdrives.

Display Data Transport

Electronic device 10 may transmit backup display data through a connection to computer 20. Data communication between electronic device 10 and computer 20 may be built on various cabled or wireless transport devices, such as universal asynchronous receiver transmitters (UARTs) or USB. Before transmission of the backup display data, processor 1 may compress the backup with a lossless compression scheme, such as the Runlength compression scheme. Processor 1 may divide the compressed backed up display data into blocks to be transmitted to computer 20. Note that processor 1 may divide the stored display data into blocks to be transmitted without compressing the display data. In some embodiments, processor 1 may respectively compress each block. Each of the blocks may comprise various units, such as one layer in a display or a datagram of a specific size independent of the layered structure of a display.

Figure 5:
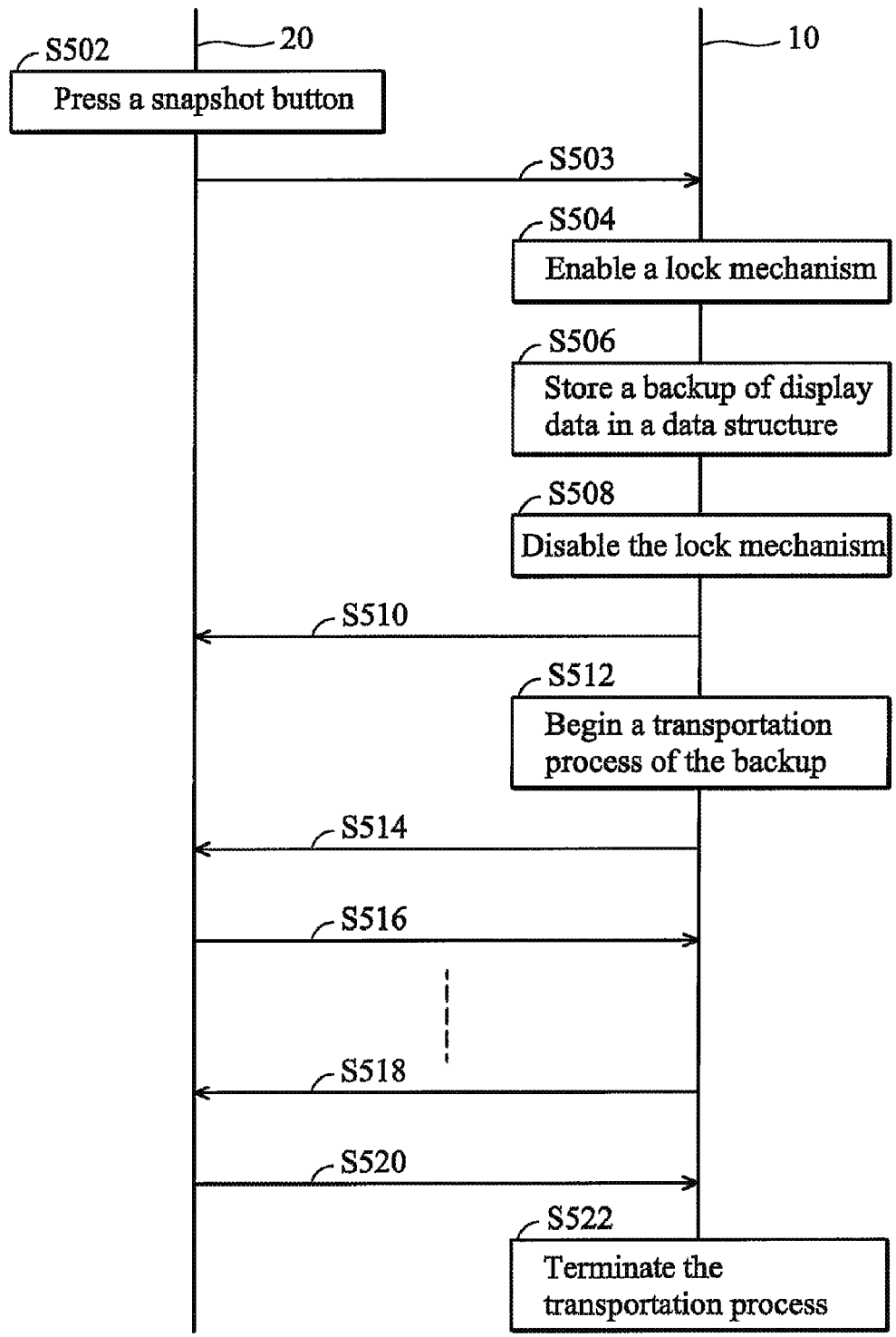
FIG. 5 is a flowchart of an exemplary embodiment of display data transportation.

With reference to FIG. 5, electronic device 10 may automatically send blocks one by one to computer 20. When a capture operation of application 12 is initialized (step S502), processor 11 transmits a second request to electronic device 10 through communication unit 14 to capture backed up display data on electronic device 10 (step S503). When receiving the second request, processor 1 enables a lock mechanism to prevent the display data to be extracted from any change (step S504), stores a backup of the display data in form of a data structure in response to the second request (step S506), and disables the lock mechanism after completion of storage of the display data in form of the data structure (step S508). When the backup of the display data is successfully stored in an assigned location, processor 1 reports successful completion of storage of display data to computer 20 (step S510) and begins transport of the backed up display data (step S512).

After sending a first block through communication unit 7 (step S514), processor 1 does not transmit a subsequent block until time out or receiving acknowledgement from computer 20 for the previous block. After receiving the first block, computer 20 transmits acknowledgement indicating successful receipt of the first block to electronic device 10 (step S516).

Processor 1 sends the next block when receiving the acknowledgement or re-transmits the first block again until it receives the acknowledgement. After transmitting the last block of the backed up display data (step S518) and receiving the acknowledgement of the last block (step S520), processors 1 and 11 terminate transport (step S522).

Figure 6:
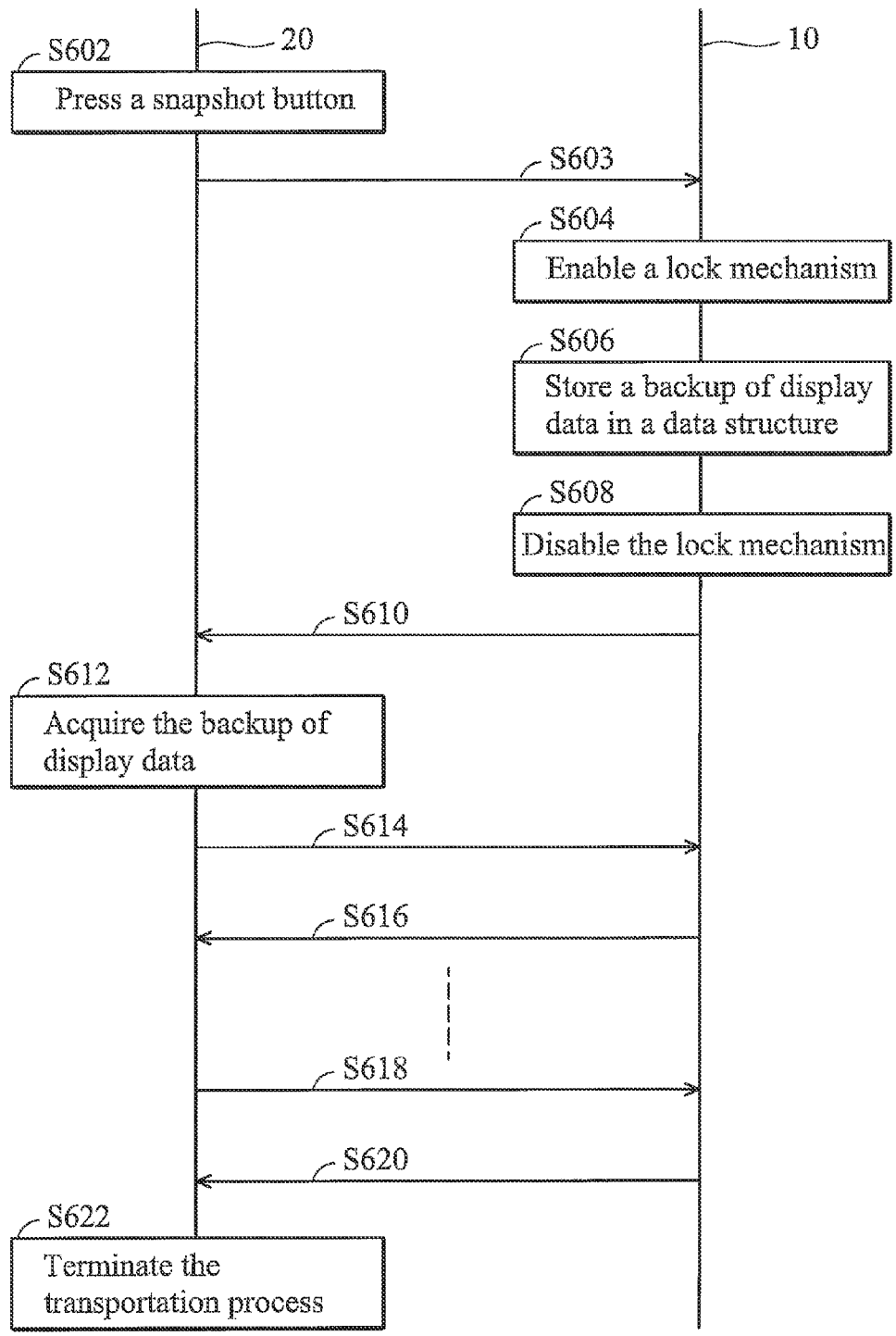
FIG. 6 is a flowchart of another exemplary embodiment of display data transportation.
Figure 7A:
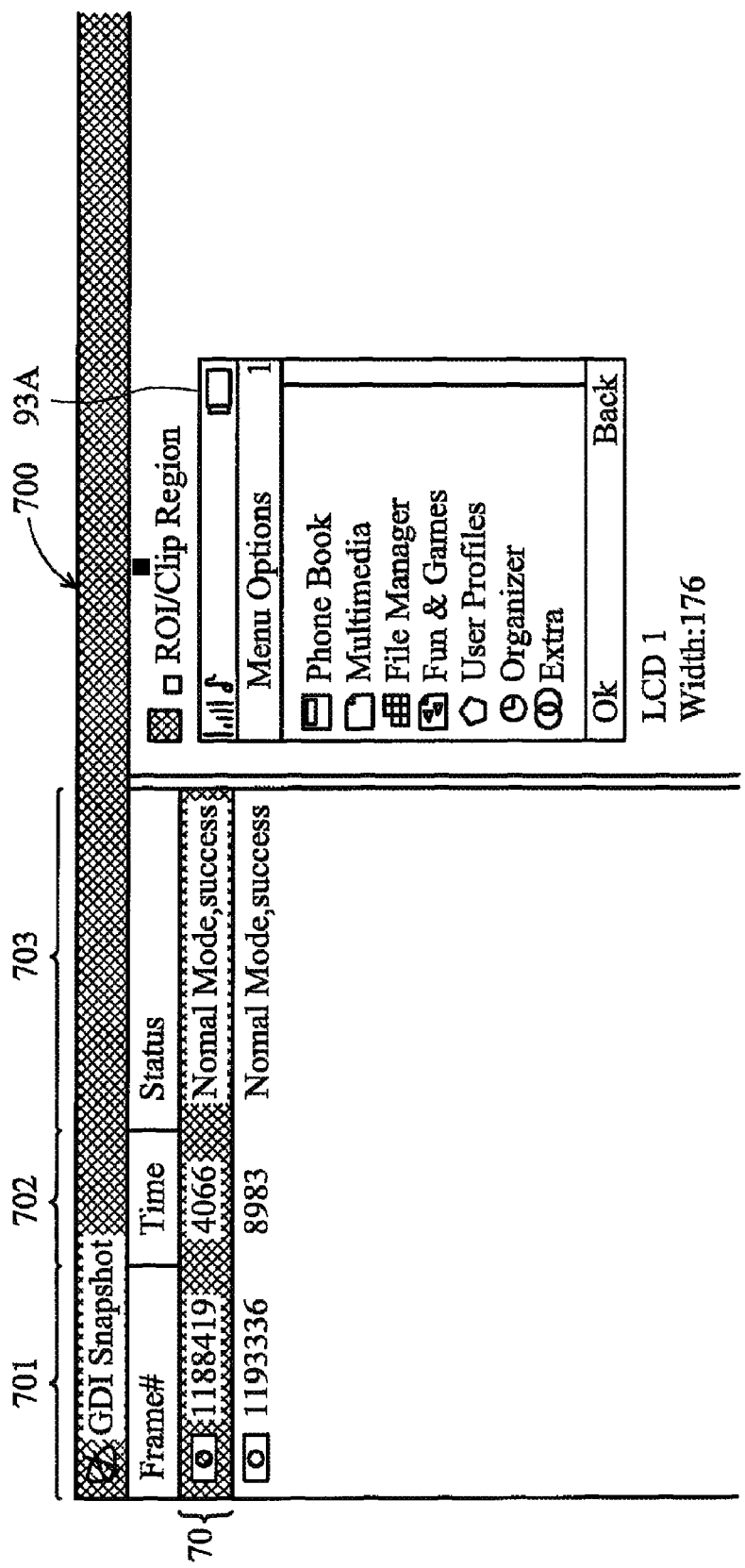
FIG. 7 is a schematic diagram of a container showing display data.
Figure 7A:
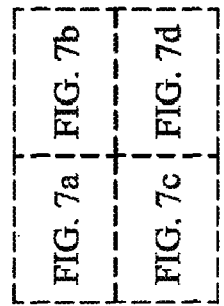
Figure 7B:
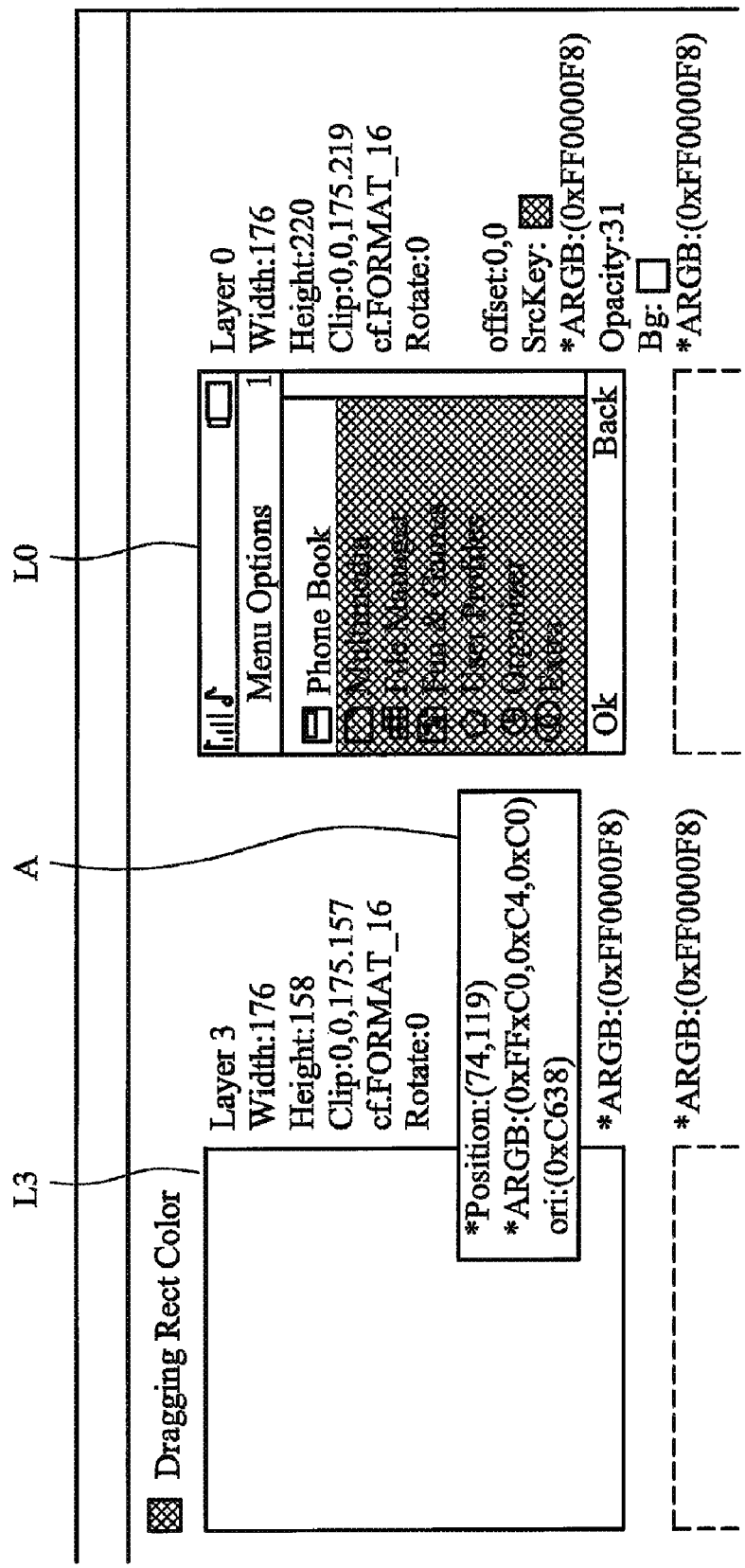
Figure 7C:
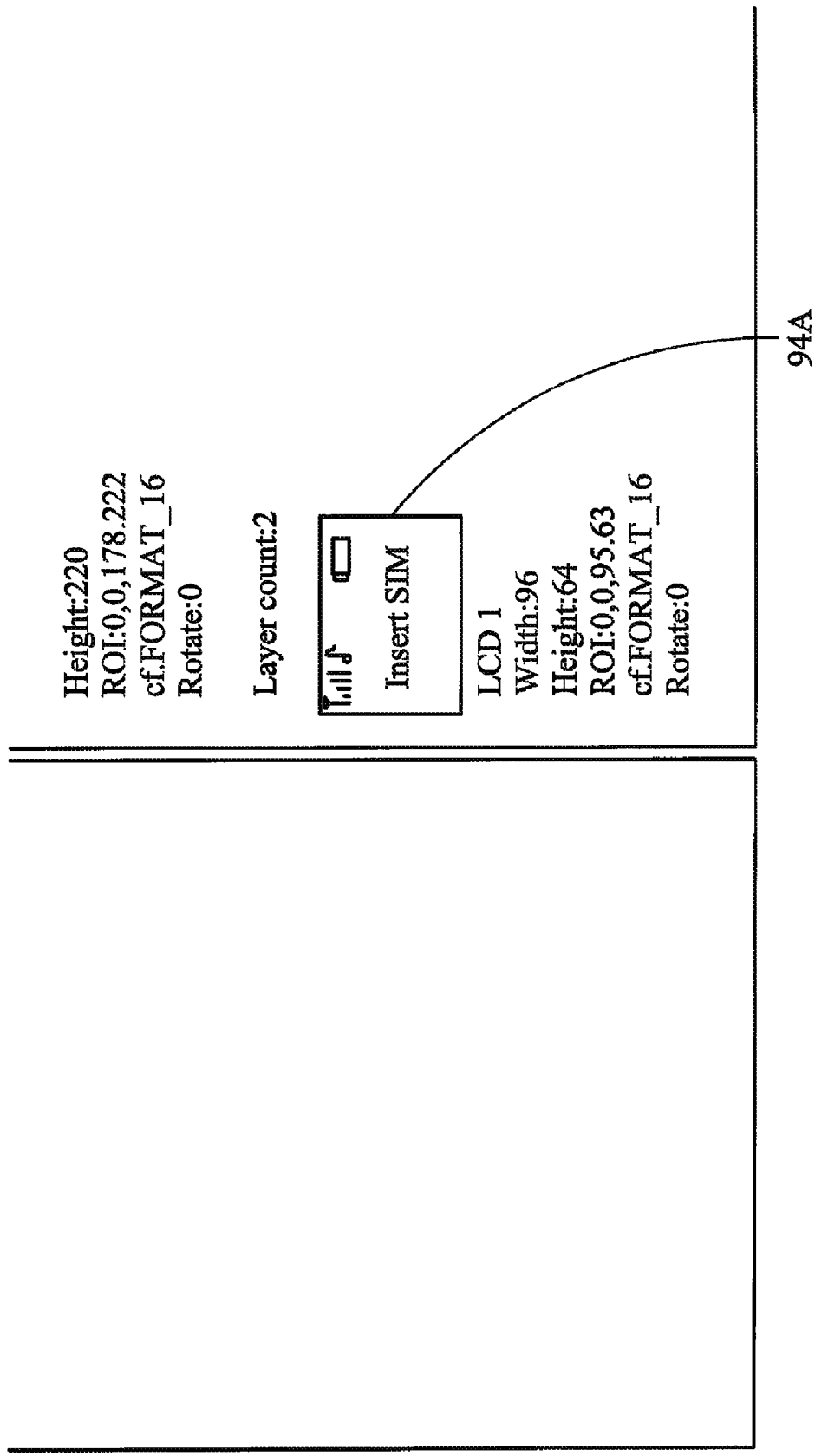

With reference to FIG. 6, computer 20 requests the saved display data. Application 12 prepares acquisition based on a report from electronic device 10. Electronic device 10 can separate the saved display data into many blocks, and application 12 in computer 20 requests data blocks one by one continuously until receiving all the display data. When a capture operation provided by application 12 is initialized (step S602), processor 11 transmits a third request to electronic device 10 through communication unit 14 to capture backed up display data on electronic device 10 (step S603). When receiving the third request, processor 1 enables a lock mechanism preventing the display data to be stored from any change from reception of the third request to completion of storing the display data (step S604), stores in form of a data structure a backup of the display data in response to the third request (step S606), and disables the lock mechanism after completing storage of the display data in form of the data structure (step S608). When the backup of the display data is successfully stored in an assigned location, processor 1 reports completion of display data storage to computer 20 (step S610). Application 12 begins acquiring the backed up display data (step S612) and sends a download request to electronic device 10 (step S614). Electronic device 10 transmits the first block of the backed up display data to computer 20 in response to the download request (step S616). Processor 1 stops transmitting a subsequent block until receiving a subsequent request from computer 20 to download the subsequent block.

Application 12 sends the final download request to electronic device 10 (step S618), and electronic device 10 transmits the final block of the backed up display data to computer 20 in response (step S620). Processor 11 then terminates the transportation process (step S622).

Application 12 can inform users of the progress of transferring display data. For example, application 12 may display the number of blocks remaining in electronic device 10. Electronic device 10 may send more debugging information to computer 20 in addition to display data.

Display Reproduction

Application 12 can reproduce displays 93 and 94 utilizing the downloaded display data and display the reproduction on display 13. As display data stored in form of the data structure (such as data structure 300 in FIG. 3) comprises various information associated with a display on electronic device 10, application 12 can represent the display by combining layers according to the order thereof stored in the display data. With reference to FIG. 7, application 12 provides images 93A and 94A in different areas of a window to simulate displays 93 and 94. Images 93A, 94A and their constituent layers are displayed in different areas of the window attached with respective settings and attributes. Image 93A is a composite image of layers L0 and L3. The background color (denoted as "Bg" in FIG. 7) of layer L0 is set as a transparent color according to the download display data, such that when layers L0 and L3 are combined orderly in the composite image 93A, layer L3 serves as the background thereof.

Entry 70 targets the downloaded display data with a frame number in field 701, a timestamp in field 702, and status description in field 703. The timestamp indicates the backup time of the downloaded display data. Application 12 may sort records of display data based on the timestamps thereof.

Display settings in window 700 attached to images 93A and 94A comprise display ID (such as "LCD 0" and "LCD 1), width and height of displays 91 and 92, ROI, color formats (such as "cf: FORMAT_16"), layer counts, and others.

Attributes of layers in window 700 comprises layer ID (such as "Layer 3", "Layer 0", and "Layer 1"), width and height of each layers, clipping areas (such as "clip: 0, 0, 175, 157"), color formats, rotation parameters, coordinates of each layer (such as Offset: 0, 0), the transparent color, the opacity ratio, background colors, and pixel color.

Area A shows the color and attributes of a referred pixel in layer L3. Thus, application 12 provides a GUI interface to display the color value of each pixel. Window 700 thus assists in determining which layer is causing problems. Application 12 also provides coordinates of any UI component to assist in adjusting display layout.

Variations

Rather than capturing all layers of a display, a specific layer or an object therein may be individually selected, extracted, stored, and transmitted. For example, a record of extracted display data may comprise only one layer with a selected object. Specific layers or objects may be selected by their IDs, a frame surrounding a selected object, or via operations on a touch panel or a touch display. Selection of layers or objects may be transmitted together with a request for display extraction or embedded therein.

Settings and attributes of displays, drivers, displays, and layers may be also respectively specified for extraction or discarded in a display extraction operation.

Different versions of display data may be prioritized for transmission. For example, backed up display data with the most recent timestamp may be transmitted first. Alternatively, an assigned backup or a backed up display data associated with an abnormal display may be transmitted first. Similarly, different portions of one display data version may be further prioritized in an order according to which they are transmitted. Device 10 may automatically manage priority assignment. Application 12 in computer 20 may assign priorities when requesting display data extraction.

A handler performing the extraction is preferably provided with a high priority to support normal execution when exceptions occur, and if necessary, stop other processes in device 10.

CONCLUSION

The display data extraction method captures raw data for one or many displays, attributes thereof, display settings, and other data in addition to display snapshots. An electronic device with one or more displays can capture backed up display data associated with displays periodically or in response to request, and sends the stored display data to another computer which may reproduce the one or more displays utilizing the captured display data. When a display comprises a composition of layers organized in a layered structure, the computer may respectively display the layers and attributes thereof, and reproduce the display by flattening the layered structure.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for troubleshooting a plurality of images displayed on a display of an electronic device, comprising:
receiving, by the electronic device, a first request for data capture associated with a first of the images displayed on the display, wherein the first image is composed of and generated from a first image layer;

in response to the first request, storing, by the electronic device, a first backup of display data comprising the first image, the first image layer, and a first timestamp thereof indicating when the first backup is stored;

receiving, by the electronic device, a second request for data capture associated with a second of the images, wherein the second image is composed of a second image layer;

in response to the second request, storing, by the electronic device, a second backup of display data comprising the second image and the second image layer, and a second timestamp thereof indicating when the second backup is stored; and transmitting, by the electronic device, the first backup with the first timestamp, and the second backup with the second timestamp to a computer for troubleshooting the displayed images captured at different times on the electronic device.

2. The method as claimed in claim 1, wherein the storing step further comprises storing attributes of one or more raw data objects to generate the first image.

3. The method as claimed in claim 2, wherein the attributes comprise runtime settings of the raw data objects.

4. The method as claimed in claim 3, wherein the runtime settings comprise at least a position on the display, a dimension, a rotation, a color format, or a clipping area of the raw data object.

5. The method as claimed in claim 1, wherein the first image layer is organized in a layered structure to form the first image, and the storing step further comprises storing the layered structure in the first backup.

6. The method as claimed in claim 1, wherein the first request is sent from the computer or triggered by an input device of the electronic device.

7. The method as claimed in claim 1, wherein, before transmission, the backup of the first display data is compressed with a lossless compression scheme, and divided into blocks to be transmitted to the computer, wherein each of the blocks comprises the first image layer.

8. The method as claimed in claim 1, further comprising displaying, by the computer, the display data on a display of the computer for troubleshooting the displayed images on the display of the electronic device.

9. A method for troubleshooting a plurality of images displayed on a display of an electronic device, comprising:

periodically setting, by the electronic device, a timer for counting for a time period;

storing, by the electronic device, a backup of display data comprising a current displayed image and a related image layer, and a timestamp thereof indicating when the backup is stored in a buffer each time the timer expires, wherein the display data is locked to prevent any change until completion of the backup storage; and transmitting, by the electronic device, the backup with the timestamp to a computer for troubleshooting the displayed images captured at different times on the electronic device, wherein the current displayed image is composed of and generated from the related image layer.

10. The method as claimed in claim 9, wherein the storing step further comprises:

when the buffer is full, overwriting one or more previously stored backups with the backup.

11. An electronic device for troubleshooting a plurality of displayed images, comprising:

a processor, receiving a first request for data capture associated with a first of the images displayed on a display, in response to the first request, storing a first backup of display data comprising the first image, a first image layer composing the first image, and a first timestamp thereof indicating when the first backup is stored, receiving a second request for data capture associated with a second of the images, in response to the second request, storing a second backup of display data comprising the second image and a second image layer composing the second image, and a second timestamp thereof indicating when the second backup is stored, and transmitting the first backup with the first timestamp, and the second backup with the second timestamp to a computer for troubleshooting the displayed images captured at different times on the electronic device.

12. The electronic device as claimed in claim 11, wherein the processor further stores attributes of one or more raw data objects to generate the first image.

13. The electronic device as claimed in claim 12, wherein the attributes comprise runtime settings of the raw data objects.

14. The electronic device as claimed in claim 13, wherein the runtime settings comprise at least a position on the display, a dimension, a rotation, a color format, or a clipping area of the raw data object.

15. The electronic device as claimed in claim 11, wherein the first image layer is organized in a layered structure to form the first image, and the processor further stores the layered structure in the first backup.

16. The electronic device as claimed in claim 11, wherein, before transmission, the processor compresses the display data with a lossless compression scheme, and divides into blocks to be transmitted to the computer, wherein each of the blocks comprises one of the first and second image layers.

17. An electronic device for troubleshooting a plurality of displayed images, comprising:

a processor, periodically setting a timer for counting for a time period, storing a backup of display data comprising a current displayed image and a related image layer, and a timestamp thereof indicating when the backup is stored in a buffer each time the timer expires, and transmitting the backup with the timestamp to a computer for troubleshooting the displayed images captured at different times on the electronic device, wherein the display data is locked to prevent any change until completion of the backup storage, wherein the current displayed image is composed of and generated from the related image layer.

18. The electronic device as claimed in claim 17, wherein the processor further, when the buffer is full, overwrites one or more previously stored backups with the backup.

* * * * *